Oct. 4, 1932.  C. W. PARKER  1,881,094
LUBRICATING APPARATUS
Filed Feb. 29, 1928
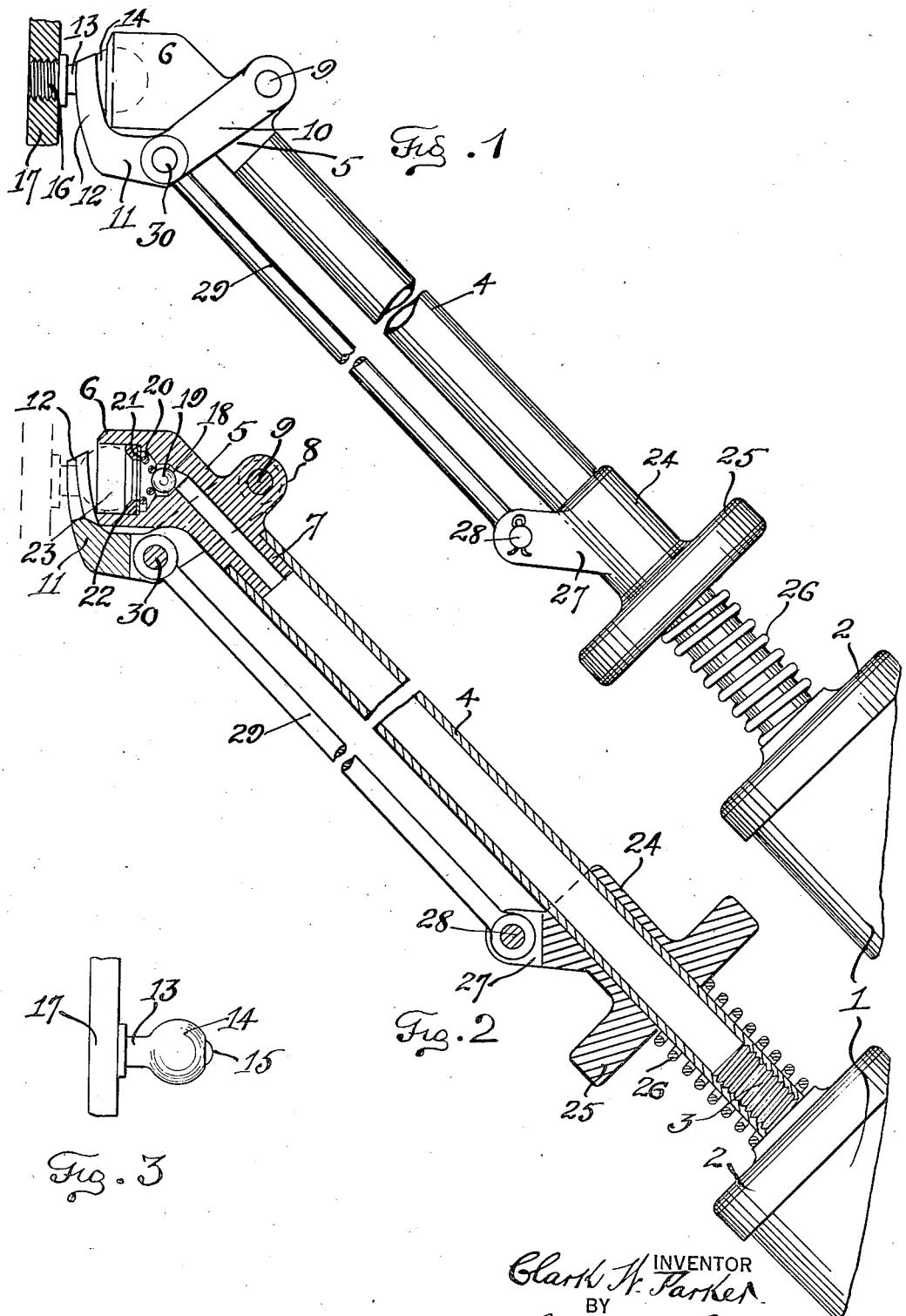

Patented Oct. 4, 1932

1,881,094

UNITED STATES PATENT OFFICE

CLARK W. PARKER, OF NEW YORK, N. Y., ASSIGNOR, BY MESNE ASSIGNMENTS, TO THE LUBRICATION CORPORATION, OF SOUTH BEND, INDIANA, A CORPORATION OF DELAWARE

LUBRICATING APPARATUS

Application filed February 29, 1928. Serial No. 257,880.

This invention relates to lubricating apparatus specially adapted for motor vehicles, and also useful in connection with industrial and other machinery, and the invention relates particularly to apparatus, or a system of means, for creating pressure upon the lubricant which is employed for the purpose of lubricating the bearings of the machinery, and for creating moderate pressure upon limpid lubricant, such as oil, for which the apparatus is equally well adapted.

Among the objects of my invention may be noted the following: To provide apparatus capable of quick attachment and detachment from a fitting or grease holder which may be set at the end of a gland or conduit leading to the bearings of the machinery to be lubricated, and this without twisting, rotating or screwing together the parts constituting the coupling; to provide an apparatus for lubricating purposes with means by which it may be quickly attached, coupled or secured to a fitting by a mere thrust or pushing movement; to provide lubricating apparatus with means by which it may be coupled to a fitting or grease cup and held to the latter yieldingly and in such manner as to enable the apparatus to be shifted, rotated and adjusted at practically any degree or angle with reference to the direction of flow of the lubricant through the fitting, and thus enabling the fitting to be reached or approached regardless of the position of the fitting or the difficulty of access thereto, due to the location thereof on the machinery; to provide a lubricating apparatus adapted for the supply of all kinds of lubricant to the machinery, such as free flowing oil and grease of any degree of inspissation; to provide a lubricating apparatus with a yieldingly operated clutch capable of engaging and embracing the head of a fitting and of being operated readily by the hand holding the apparatus; to provide a lubricating apparatus comprising a gun or compressor, a rigid hose or tube, and a nozzle including a coupling means yieldingly applied thereto and operated by means carried by the hose and accessible to the hand of the operator which supports and holds and manipulates the gun; and to provide a lubricating apparatus consisting of four simple interacting means which are separable from each other and readily assembled and dissociated, and which are economical to construct, strong, durable and easy to manipulate.

With the foregoing objects in view and others which will be detailed during the course of this description, my invention consists in the parts, features, elements and combinations thereof hereinafter described and claimed.

In order that my invention may be clearly understood, I have provided a drawing wherein:

Figure 1 is a view showing, in side elevation, a lubricating apparatus embodying my invention, the same being shown as coupled with a fitting applied to the frame of machinery, the bearings of which receive the lubricant;

Figure 2 is a view showing the structure of Figure 1 in longitudinal sectional elevation; and Figure 3 is a view showing in side elevation a fitting adapted to cooperate with the coupling means of my apparatus.

In the drawing, the numeral 1 indicates a part of any form of compressor or gun adapted to hold a supply of lubricant, it being understood that the gun may be one of high-pressure or low-pressure, of screw-type, lever-type or push-type, my invention not relating specifically to the form of the gun, but merely to the latter in combination with the other parts of my apparatus. In the form shown, the gun is provided with an end-cap 2, which is detachable from the delivery end of the gun, for all usual purposes, and may be threaded to the latter in conventional manner. The cap is provided with an externally screw-threaded extension 3, onto which is threaded one end of a rigid hose 4 of indefinite length, said hose being detachable from the gun by the means shown. At the outer end of the hose 4, I provide a nozzle 5, having a socket portion 6 arranged at an angle to the body of the nozzle, the inner end of the said body being provided with a reduced portion 7 providing a nipple entering the hose 4 and secured thereto in any suitable manner, as by welding or brazing, or in some manner enabling the nozzle to be detached from the hose, when desired. The nozzle, between its socket-end 6 and its nipple 7, is provided with an enlargement or lug 8, bored transversely for the reception of a pivot pin 9 passing through the outer, bifurcated end of a lever 10 of the third order. The pivot pin 9 passes through the two arms of the bifurcated portion, and the lever thus swings from, and is mounted on, the said nozzle 5. In general form, the lever 10 is L-shaped, the foot 11 of the lever being extended at an obtuse angle to the bifurcated end thereof. The said foot of the lever is bifurcated as at 12, the arms being adapted to straddle the stem 13 of a fitting 14, which is spherical in form and is provided with a spring-held closure or valve 15, as will be readily understood, which spring is not shown, since the specific structure of the fitting is no part of my invention. The fitting has a threaded portion 16 set in the member 17 constituting a frame portion of the machinery, the gland of which is capped by the fitting.

The nozzle 5 and the lever 10 constitute a rapid coupling means for engaging the fitting, and, by reason of the construction of the coupling means, the fitting can be reached and engaged, for lubricating purposes, regardless of the position of the fitting or the difficulty of access thereto.

The socket member 6 of the nozzle is set at an obtuse angle to both the nozzle and the hose, and, interiorly at said angle a seat 18 is provided for a closure or ball-valve 19, which yieldingly seals the passage through the hose 4, the nozzle 5 and the socket 6. To maintain the valve on its seat, under normal conditions, an expansion spring 20 is set within a chamber of the socket 6, between the valve and a metal washer 21, which is also the backing for a compressible gasket 22, forced within the socket and rigidly held therein by friction. By this means leakage of lubricant normally limpid, or caused so to be by temperature, is prevented from passing to the socket chamber 23, when the apparatus is not in use. The chamber 23, in the socket member 6, is cylindrical in form and is adapted to engage the spherical head 14 of the fitting by tangential engagement therewith, as is also the foot 11 of the coupling lever, the two members thus being able to swing entirely around the functional axis or passage of the fitting, and to the extent of many degrees at an angle to said axis in all points of the compass. From the foregoing it will be seen that with the aperture in the gasket and washer made abnormally large, and with the spring-chamber made considerably larger than the passage through the nozzle, there is no practical limitation upon the angle at which the apparatus can be shifted relatively to the functional axis of the fitting for lubricating purposes. This is highly important and is a feature of my invention upon which I desire to lay stress.

To enable the coupling means to be readily applied to the fitting, regardless of the angle of approach to the latter, the lever 10 is caused to be shifted, relatively to the nozzle which carries it, by a simple manipulating means carried by the hose, such means consisting of a sleeve 24 having a handle 25,—which may be of any form desired, such as a straight bar or a disk,—the sleeve being freely slidable upon the hose, and normally forced toward the nozzle by a spring 26 surrounding the hose and engaging the sleeve at one end and the cap 2 of the gun at the other end. The sleeve 24 is provided with a bifurcated angularly extended lug 27 through the arms of which is extended a pivot pin 28 affording a connection between the lug and a rod 29, the outer end of which latter is coupled, as by a pin 30, to the arms of the bifurcated portion of the lever 10, the connection 30 being at the crotch of the bifurcation. In all instances, cotter pins, or other holding means, may be passed through the pivot pins 9, 28 and 30, to prevent the latter from being lost or the parts accidentally separated. Thus, under spring tension, the coupling lever 10 is normally forced into cooperative relation with the nozzle 5 and is separated therefrom by pressure upon the handle 25 against the tension of the spring 26, when it is desired to uncouple the apparatus from the fitting, or when the angle of approach is such as to require that the member 11 shall be shifted relatively to the socket 6 of the nozzle. Such manipulation can be done by the one hand of the operator while he is holding and shifting the apparatus. It is a feature of my invention that the lever 10 is normally in the position, and maintained thus, of Figures 1 and 2, and that it is shiftable, under spring control when desired, by simply extending the fingers of the hand which holds the apparatus.

It is also a feature of my invention that a sealing means is provided, such as the valve 19, at the junction of the spring-chamber and the passage through the nozzle, such sealing means preventing leakage of limpid oil and grease in the presence of temperature; it being understood that my apparatus is adapted for light and heavy oils, and light and heavy grease. The large passage through the hose, not materially restricted by the difference in size of the passage through the nozzle, enables heavy grease to be passed freely to the fitting; and the larger the diameter of the passage through the nozzle, the greater the pressure which can be exerted upon the column of grease without undue back pressure in the hose and the gun.

This avoids the necessity for a so-called "high-pressure" gun of, for example, the lever-type. Moreover, by providing the large spring-chamber surrounding the valve 15 of the fitting, high-pressure—or any pressure,—exerted upon the column of grease in the hose and nozzle would greatly facilitate the forcing of grease through the fitting and, as a preliminary, unseating the valve 15.

An important feature of my manipulating means for the coupling lever 10 is the fact that the sleeve 24 has a long bearing on the hose 4 which avoids binding between the parts and enables the sleeve to slide freely and readily under the slightest finger pressure, and under the pressure or expansive force of the spring 26. Moreover, this ease or facility of movement of the sleeve 24 is effective with reference to the movement of the lever 10, when the apparatus is engaged with the fitting; that is to say, the lightest pressure imposed upon the ends of the arms 12 of the foot 11 of the lever 10, will cause the latter to readily swing around its fulcrum at 9 on the nozzle; and the form of the lever,—of the third order,—facilitates the swinging movement of the lever since the application of power is so far away from the axial swinging point. Furthermore, the angle of the foot 11 with reference to the plane of the end of the socket 6 is such that pressure upon the fitting in the space between the end of the socket and the toe of the foot 11 will cause the fitting to quickly and readily slide between the two coupling members and into the chamber of the socket, the stem 13 of the fitting readily sliding into the bifurcation of the foot. This angular relation of the foot and socket is of importance in both coupling and uncoupling operations; and the ease with which the sleeve 24 slides upon the hose 4 aids the action of the lever 10, avoiding all binding action.

Another important feature of my invention, upon which I desire to lay stress, is the structure of the apparatus enabling the several members thereof to be quickly detached and readily assembled. This is important in that packing and transportation are facilitated and commerce in the apparatus may be carried out as a mail order business. The hose can be removed from the gun, the nozzle can be removed from the hose, the lever can be removed from the nozzle, the rod can be detached from the lever and slide, and the latter can be removed from the hose. It may not be necessary to detach the rod and the slide, nor to detach the rod from the lever; for, when the lever is detached from the nozzle, the latter can be removed from the hose and the several parts packed in small compass for transportation. If desired, the nipple 7 of the nozzle may be threaded into the end of the hose 4.

From the operational standpoint, it is important to note that the foot 11 of the lever 10 normally stands at an acute angle to the plane of the face of the socket 6, and that the prongs of the foot member terminate between the longitudinal axis and the further wall of the socket chamber; that is to say, the prongs 12 terminate short of the chamber wall and stand at an acute angle to the plane of the face of the socket, thus leaving a space for the easy entrance of the fitting when pressure is applied to the latter for coupling the same with the nozzle. In other words, end pressure upon the ends of the prongs 12 and upon the adjacent face of the socket 6 will cause the lever 10 to yield, thus allowing the coupling means to be readily applied to the fitting, regardless of the angle of approach to the latter.

Having thus described my invention, what I claim and desire to secure by Letters Patent is:

1. A lubrication coupler comprising, a nozzle, a coupling lever pivotally mounted on the nozzle for cooperation therewith to clamp a fitting therebetween, and means associated with the lever and slidably mounted on said nozzle for manipulating the lever.

2. A lubrication coupler comprising, a nozzle having a fitting receiving socket, a coupling lever pivotally mounted on said nozzle, and means for actuating said lever comprising a rod connected to the lever, a slide on said nozzle, and a spring surrounding said nozzle and secured at one end relative to the nozzle and normally tending to move said slide in one direction.

3. A lubrication coupler comprising, a nozzle element having a contact portion, a coupling lever pivotally secured adjacent to said nozzle element, said nozzle element and coupling lever providing a pair of jaws, and means spaced from said contact portion and movable toward and from the same for manipulating said coupling lever whereby to open and close said jaws.

4. A lubrication coupler comprising, a nozzle, a coupling lever pivotally mounted on the nozzle, means slidable with respect to said nozzle and associated with said coupling lever, and means on said lever operated by movement of said slidable means for urging a fitting toward said nozzle when a fitting is disposed therebetween.

5. A lubrication coupler comprising, a nozzle having a socket at one end, said socket being inclined at an angle thereto, a coupling lever pivotally mounted adjacent the nozzle and having an end overhanging said socket, said lever end having a portion adapted to interact with a fitting and cooperative with the socket for clamping the fitting against said socket, and means spaced from said socket and slidable relative thereto and cooperative with said lever whereby to urge the said end of the lever toward said socket.

6. A lubrication coupler comprising, a nozzle having a socket portion directed at an angle to the body thereof, said socket being provided with a relatively large substantially cylindrical chamber, a coupling lever pivotally mounted on the nozzle and having a bifurcated end portion overhanging said socket, said bifurcated portion terminating at a point beyond the longitudinal axis of the socket and chamber, and means slidably mounted on said nozzle for relative movements toward and from said socket portion and cooperative with said lever upon movement in one direction for swinging said lever about its pivot to draw said bifurcated portion and said socket relatively together.

7. A coupling for a lubricating system, comprising a nozzle having two portions at an angle to each other, one portion having a large socket to receive the head of a fitting, a chamber back of the same, sealing means at the back of the chamber, and the other portion having a passage therethrough extending from the sealing means, in combination with a jaw pivotally mounted on the nozzle and extending over the socket to aid the latter in gripping the fitting.

8. A lubrication coupler comprising, a tube, a member pivoted on said tube, means movable relatively to said tube for moving said pivoted member, and a jaw secured to said pivoted member and movable toward and from one end of said tube when said pivoted member is actuated.

9. A lubrication coupler comprising, a lubricant supply tube, a nozzle on said tube, a movable clamp member cooperative with said nozzle to clamp a fitting thereagainst, a sleeve, a rigid rod connecting the sleeve and member, a handle on said sleeve adapted to move said movable member through said rigid rod, and a resilient element for moving said handle in one direction.

10. A lubrication coupler comprising, a member providing a lubricant supply duct and having a fitting contact portion about one end of said duct, means pivotally associated with said member and extending adjacent to said contact portion for engaging a cooperative part of a fitting relatively to draw the fitting into tight clamping engagement with said contact portion upon movement of said means about its pivot, and means including an element slidable relatively to said duct member for urging said pivotally associated means about said pivot in a direction to effect said clamping.

11. A lubrication coupler comprising, a member providing a lubricant supply duct and having a lubricant fitting contact portion at one end of said duct, a lever of the first class pivoted on said member, one end of said lever overhanging said contact portion, said contact portion together with said lever end providing a clamp for securing a fitting therebetween, and means mounted on said duct member for movement longitudinally thereof for swinging said lever in one direction about its pivot.

12. A lubrication coupler comprising a nozzle element having a contact portion, a coupling lever pivotally secured adjacent to said nozzle element, said nozzle element and coupling lever providing a pair of jaws, and means independent of said lever and spaced from said contact portion and movable toward and from the same for manipulating said coupling lever whereby to open and close said jaws.

13. A lubrication coupler comprising a tube, a member pivoted on said tube, means independent of said pivoted member and movable relatively to said tube for moving said pivoted member, and a jaw secured to said pivoted member and movable toward and from one end of said tube when said pivoted member is actuated.

CLARK W. PARKER.